United States Patent Office 2,807,646
Patented Sept. 24, 1957

2,807,646

MANUFACTURE OF CHLOROFLUOROACETONES

Charles B. Miller and Cyril Woolf, Morristown, N. J., assignors to Allied Chemical & Dye Corporation, New York, N. Y., a corporation of New York No Drawing. Application March 14, 1955,
Serial No. 494,238

6 Claims. (Cl. 260—593)

This invention relates to organic fluorine compounds, and is particularly directed to methods for making perchlorofluoroacetones and to certain perchlorofluoroacetone products.

In our copending applications Serial No. 411,028, filed February 17, 1954 (now abandoned) and Serial No. 494,237, filed March 14, 1955, we have disclosed and claimed perchlorofluoroacetones—containing at least one fluorine atom and at least one chlorine atom—and processes for making such materials. The present invention is directed to particular processes for making some of the foregoing and other similar products. The compounds disclosed herein are valuable chemical intermediates, and constitute raw materials for manufacture of fluorine containing products in operations not part of this invention.

Among other features, our copending application describes and claims perchlorofluoroacetone product manufacture processes which comprise liquid phase fluorination reactions involving use of pentavalent antimony fluorochloride. While liquid phase reactions of the type indicated may be practiced successfully on commercial scale, nevertheless liquid phase processes utilizing antimony halide type fluorinating agents are characterized by recognized disadvantages, among which are the corrosiveness of the antimony halide fluorinating agents, difficulties arising out of the use of a liquid fluorinating agent as distinguished from a solid catalyst, and relatively high antimony halides volatility which causes gas line plugging. Hence, objects of the present invention include development of completely gas phase methods for preparing perchlorofluoroacetones by means of an advantageous solid catalyst.

The instant improvements provide for manufacture of perchlorofluoroacetones containing at least one fluorine atom and at least two chlorine atoms. It has been discovered, according to the present invention, that the hereindescribed perchlorofluoroacetones may be made by contacting in gas phase a certain class of starting materials with a solid zirconium fluoride ($ZrF_4$) catalyst, which is substantially non-crystalline in structure, while in the presence of gaseous hydrofluoric acid. Major aspects of this invention include discovery of certain new perchlorofluoroacetones, determination of a particular class of compounds which may be used as starting materials, and the discovery of the fluorinating properties of a particular catalyst with respect to the starting materials involved. Because of determination of the starting materials and the conjunctive discovery of the catalytic properties of the zirconium fluoride catalyst as to the indicated starting materials, it becomes possible to manufacture perchlorofluoroacetone products including certain perchlorofluoroacetones not heretofore known, and to make the sought-for products by a wholly gas phase procedure which does not cause substantial decomposition of either starting materials or products.

Referring to suitable starting materials, it has been ascertained that the products of the invention may be obtained from a relatively specific class of starting materials which do not contain hydrogen and hence are defined herein as perhalogenated acetones. In the broader aspects, the starting materials comprise perchloro- or perchlorofluoroacetones containing zero to not more than 3 fluorine atoms, and wherein all halogens are of the group consisting of chlorine and fluorine. In the preferred embodiments of the invention, the starting material is hexachloroacetone, i. e. $CCl_3.CO.CCl_3$, a liquid under normal conditions having a boiling range of 202–204° C.

It is important that the invention starting materials should contain no hydrogen. It has been found that, when proceeding in accordance with the process aspects of the invention, any attempt to use starting materials containing any hydrogen, results in formation of substantially none of the herein sought-for products, but on the other hand causes vigorous decomposition of the hydrogen-containing starting material with formation of unwanted compounds such as phosgene, carbon monoxide, halogenated methane derivatives and resinous tars. Hence, starting materials of the invention are perhalogenated acetones containing no hydrogen. As to selection of suitable starting material, another factor is fluorine content. While starting material containing some fluorine may be employed, the materials utilized should contain not more than 3 fluorine atoms, the balance of halogen being chlorine.

Representative examples of suitable starting materials are those compounds containing indicated limited amounts of fluorine such as monofluoropentachloroacetone ($CFCl_2.CO.CCl_3$); difluorotetrachloroacetone, $$(CFCl_2.CO.CFCl_2);$$

asym-difluorotetrachloroacetone, ($CF_2Cl.CO.CCl_3$); trifluorotrichloroacetone, ($CCl_2F.CO.CClF_2$); asym-fluorotrichloroacetone, ($CF_3.CO.CCl_3$); and the preferred hexachloroacetone ($CCl_3.CO.CCl_3$). It will be understood that if a compound such as monofluoropentachloroacetone is utilized as starting material, practice of the invention results in a product which contains at least 2 atoms of fluorine and may contain as much as 4 fluorine atoms. Similarly, if the starting material is trichlorotrifluoroacetone ($CCl_2F.CO.CClF_2$), the product obtained therefrom contains more fluorine and may be tetrafluorodichloroacetone ($CClF_2.CO.CClF_2$). The current commercially important raw material most adaptable for use as a starting material is hexachloroacetone, and thus for convenience the invention is described herein largely in connection with use of hexachloroacetone as the starting material.

The zirconium fluorides used as catalysts according to the present invention have the property of catalyzing fluorination of the above described oxygen-containing starting materials to form the perhalogenated fluoroacetone products to such an extent that good yields (percentage of sought-for product recovered based on the amount of such product theoretically obtainable from the starting material converted), good conversions (percentage of starting material which undergoes reaction), smooth operation, and substantial absence of decomposition of starting materials and products may be realized under readily maintained operating conditions.

Zirconium fluorides including the anhydrous $ZrF_4$ are known in the art. However, zirconium fluorides in general, though possibly of powdery and small discrete particle characteristics, are composed of $ZrF_4$ crystals of relatively large size, i. e., not less than one thousand and usually several thousand Angstrom units radius and above. Other forms of $ZrF_4$ as described herein, when examined by the highest powered optical microscope, appear to be of non-crystalline or "amorphous" structure. When these "amorphous," by ordinary standards, zirconium fluorides are examined using X-ray diffraction technique, such materials are found to be bordering on the amorphous condition, and are extremely small, submicroscopic crystals which are designated in the art as "crystallite." According to the invention, the $ZrF_4$ catalysts thereof are catalytically useable size (mesh) increments, e. g. granules or pellets, which are constituted of such "amorphous" zirconium fluoride having crystallite size. The desired catalytic activity prevails in zirconium fluorides of crystallite size of about 400 Angstrom units radius or below. As crystallite size decreases below this value, desired catalytic activity increases and particularly preferred zirconium fluorides include those having crystallite size of about 150 A. and below, as determined by X-ray diffraction technique.

The scope of the invention includes substantially anhydrous zirconium fluorides ($ZrF_4$) having the indicated crystallite size, and provided such fluorides are derived by reaction of substantially anhydrous $ZrCl_4$ and substantially anhydrous hydrogen fluoride. The improved catalytic material employed is prepared by treating $ZrCl_4$, which is preferably as anhydrous as commercially feasible and preferably in pure form but may suitably be of commercial or technical grade, with preferably excess quantities of inorganic fluorinating agent reactive therewith under conditions such that no liquid water is present in the reacting materials. For example, catalysts may be prepared by treating solid substantially anhydrous zirconium chloride (intended herein to designate $ZrCl_4$ and not other forms of zirconium chloride) with gaseous substantially anhydrous HF. In a gas phase fluorination operation, using HF, temperatures may be anything from above the vaporization point of HF up to about 250° C. at which temperature e. g. anhydrous $ZrCl_4$ begins to sublime appreciably. If desired, the reaction may be carried out with fluorinating agent in the liquid phase. In the catalyst synthesis reaction, HF displaces HCl causing transformation of $ZrCl_4$ to $ZrF_4$. To condition the material for better catalytic use, the resulting zirconium fluoride may be heated in an anhydrous atmosphere at elevated temperature, i. e., temperature at which conditioning or activation takes place. The finished catalyst is then recovered. Heating the $ZrF_4$ in a stream of dry nitrogen or anhydrous HF gas for about one to four hours at temperatures of about 300–350° C. or four to six hours at 250–300° C. is ordinarily suitable for this purpose. In some circumstances, the catalyst may be activated by heating the $ZrF_4$ in a stream of free oxygen-containing gas such as oxygen or air at about 400–500° C. for approximately 30 minutes to eight and one-half hours, depending mostly on the oxygen content of the treatment gas, in which case conditioning with dry nitrogen or HF gas as above mentioned may be omitted.

Zirconium fluorides prepared by the above described method of treating anhydrous $ZrCl_4$ with substantially anhydrous HF have been found to be composed of crystallites of size below about 400 A., and generally substantially below 120 A. as is desired for use in the invention. Gas phase preparation of catalyst is illustrated in the following example, in which parts and percentages, unless otherwise noted, are on a weight basis.

EXAMPLE A 180 parts of 4 to 14 mesh anhydrous zirconium tetrachloride of commercial grade were charged to a one inch I. D. tubular nickel reactor provided with inlet and outlet connections for a gas stream and means for externally cooling the reactor by blasts of air. An externally disposed electrical resistance heater was also supplied to furnish heat to the reactor when needed. Gaseous anhydrous HF, initially at the rate of 20 parts per hour, was passed through the reactor while maintaining the maximum internal temperature in the reactor in the range of 60–70° C. by adjusting the extent of external cooling. Reaction of $ZrCl_4$ and HF to form $ZrF_4$ and HCl was effected. Means were provided for sampling the reactor effluent gas to determine the presence of HF and/or HCl. Initially, the point of maximum reaction temperature was near the upstream end of the bed of solid zirconium chloride. Exit gas from the reactor was periodically sampled and when the evolution of HCl began to slacken and HF began to appear, the reaction temperature was gradually raised to 200° C. After 5 hours reaction, the reactor effluent gas contained only HF and was substantially free of HCl. 130 parts of zirconium fluoride, containing 98% $ZrF_4$ and less than 0.5% chlorine, in hard granular form and having substantially the same mesh size as the initial zirconium chloride, were obtained. An X-ray diffraction pattern of zirconium fluoride catalyst so prepared showed that the material, constituting the approximate 4–14 mesh catalyst, had average crystallite size of about 50 Angstrom units radius, i. e. the crystallite size was so small as to be indicative of "amorphous" structure.

If, in the gas-phase operation such as just detailed, the $ZrCl_4$ is initially in very fine or powdery form, prior to HF gassing the material may be pelleted to e. g. 4–25 mesh size, in which case pelleting should be done preferably under conditions as anhydrous as feasible.

Another suitable and convenient means for preparing the zirconium fluoride catalyst is to add solid anhydrous $ZrCl_4$ to an excess of liquefied anhydrous hydrofluoric acid in a cooled container and, after complete addition of the $ZrCl_4$, mildly agitate the mixture until reaction is substantially complete. The $ZrF_4$ so prepared may be then conditioned or activated as outlined above. Following is an example in which parts and percentages are on a weight basis, illustrating preparation of $ZrF_4$ catalyst according to the latter wet method.

EXAMPLE B 175 parts of granular (4 to 14 mesh) anhydrous $ZrCl_4$ of commercial grade were added in small portions to liquid anhydrous hydrofluoric acid contained in an externally cooled vessel. Vigorous exothermic reaction took place and additional amounts of liquid anhydrous HF were added as needed to maintain an excess thereof. After all the zirconium chloride had been added, the mixture was stirred to promote residual reaction. When reaction of zirconium chloride appeared complete, the mass was mixed and stirred with additional liquid hydrofluoric acid and excess HF was removed by slowly boiling the mixture. 125 parts of anhydrous zirconium fluoride of about 4–20 mesh size having greater than 98% $ZrF_4$ content and containing less than 0.5% chlorine were recovered. This $ZrF_4$ was heated in a stream of dry inert gas (nitrogen) at a sufficiently elevated temperature, about 300° C., and a period of time sufficiently long, about 3 hours, to condition and activate the material. The mesh size distribution of the $ZrF_4$ particles did not change substantially during the latter heat treatment. An X-ray diffraction pattern of the catalyst thus prepared showed that the 4–20 mesh catalyst comprises material of crystallite size of about 50 A., i. e. the crystallite size was so small as to be indicative of "amorphous" structure.

In the utilization of the catalysts of the invention to effect fluorination of the starting material indicated, reaction temperatures are maintained at or above the level at which fluorination of the particular starting compound begins to take place in the presence of gaseous HF and the solid $ZrF_4$. Generally speaking, in the case of starting materials utilizable as hereindescribed, some fluorination may be noted at temperature as low as about 210° C., which temperature, it is noted, is just above the 202–204° C. boiling point of the preferred $CCl_3 \cdot CO \cdot CCl_3$ starting material. However, reaction proceeds at a more satisfactory rate and fluorination will generally be more complete at temperatures upwardly of about 275° C. Fluorination proceeds and yields of sought-for products may be realized at temperature as high as about 450° C.

For reasons of economy and to guard against decomposition of starting material and products, higher temperatures are not particularly desirable.

Choice of reaction temperature is determinable to a degree by the nature of the starting material employed and the nature of the sought-for products. Generally, in the case of starting materials containing no or say one fluorine atom, and only moderate further fluorination is sought, relatively low temperatures may be used, but if good conversion or a higher degree of fluorination is desired, higher reaction temperatures are in order. Similarly, in the case of starting materials of higher fluorine content, higher temperatures are needed to effect further fluorination. For example, to effect formation of products predominantly difluorotetrachloracetone, temperatures in the approximate range of 300–350° C. are effective. For formation of products containing a relatively small amount of difluorotetrachloroacetone and larger quantities of trifluorotrichloroacetone and tetrafluorodichloroacetone, e. g. trifluorotrichloroacetone predominating, temperatures in the range of about 350–400° C. are more satisfactory. In overall general practice, temperatures in the range of about 300–400° C. are preferred.

The molar ratio of HF to starting material is determined largely by the amount of fluorine desired in the sought-for product. That is, if a higher fluorinated product is desired and the starting material contains no fluorine or only a small proportion and contains a relatively large number of chlorine atoms to be substituted, corresponding large amounts of HF are introduced into the reactor with the starting material. One mol of HF for each atom of other halogen to be substituted is the theoretical amount. On the other hand, from a practical point of view it is highly desirable to maintain the ratio of HF to organic starting material sufficiently low so that a high percentage utilization of fluorine will be obtained thereby simplifying the potentially difficult problem of recovering HF from the product mixture, since recycling of unreacted starting material is more practicable than recovery of unreacted HF. Generally, in manufacture of products containing not more than three fluorine atoms, preferably a deficiency of HF is employed, and in the case of production of monofluoropentachloroacetone, the quantity of HF used may be as little as 50% of theory. On the other hand, when making tetrafluorodichloroacetone, amounts of HF employed are preferably from about theoretical to 25% in excess of theory.

Time of contact of starting material with zirconium fluoride catalyst may be varied to some extent without noticeable sacrifice in advantageous high process efficiency. However, if contact time is excessive (low space velocities), the capacity of the reactor is low. On the other hand, if contact time is excessively short (high space velocities), the reaction of starting material to form desired product may be incomplete, thereby entailing possible high cost of recovering and recycling unreacted material to subsequent operation. Accordingly, the time of contact is determined usually by balancing economic advantages of high throughput obtained at short contact times against the cost of recovery of unreacted starting material. In general, contact time is less than about 60 seconds, and preferably contact time is less than about 20 seconds. In a particular operation the rate of flow of starting material through the reaction zone is dependent upon variables such as scale of operation, quantity of catalyst in the reactor, starting material used, product made, and specific apparatus employed. For a given operation, optimum conditions as temperature, quantity of HF, and contact time may be best determined by test run.

Generally, the process of the invention is carried out by contacting the starting compound with the $ZrF_4$ catalyst at temperature at which fluorination takes place in the presence of gaseous HF. Operations may be suitably carried out by introducing a gaseous mixture of reactants into a reaction zone containing the catalyst and heating said mixture in the zone at indicated temperatures for a time sufficient to convert an appreciable amount of the organic halogenated compound to fluorinated compound, withdrawing gaseous products from the zone and recovering said fluorinated material from the gaseous products. Operation is preferably continuous. Also, for example, for purposes of temperature control, the reactants may be diluted with other gaseous material, e. g. an inert gas such as nitrogen, and the mixture of such inert gas and reactants introduced into the reaction zone. Atmospheric pressure operation is preferred but the reaction may, if desired, be carried out at superatmospheric or subatmospheric pressure.

Representative products which may be made in accordance with the invention are as follows:

Monofluoropentachloroacetone: $CFCl_2.CO.CCl_3$—B. P. 163–166° C.

Trifluorotrichloroacetone: $CCl_2F.CO.CClF_2$—B. P. about 84° C.

Tetrafluorodichloroacetone: $CClF_2.CO.CClF_2$—B. P. about 44° C.

and the invention also provides for manufacture of $C_2F_3Cl_3=CO$, e. g. mixtures of $CF_3.CO.CCl_3$ ⎫
$CCl_2F.CO.CClF_2$ ⎬ B. P. 83–85° C.

and containing e. g. about 25 (weight) percent of the former and 75% of the latter; and for manufacture of $C_2F_2Cl_4=CO$, e. g. mixtures of $CCl_2F.CO.CCl_2F$ ⎫
$CClF_2.CO.CCl_3$ ⎬ B. P. 118–122° C.

and containing e. g. about equal weight parts of each; the foregoing mixtures and the $CF_3.CO.CCl_3$ and $CClF_2.CO.CCl_3$ constituents per se being new materials not heretofore known.

The sought-for product in the gas stream exiting the reaction zone may be recovered in any suitable manner as by condensation and subsequent fractional distillation. The identity and amount of product in the reactor exit gas stream may be determined by fractional distillation and/or conventional infrared analytical technique. The gaseous product may be condensed in a vessel maintained at a temperature substantially below the boiling point of the lowest boiling material present, e. g. by indirect cooling of the gas in a bath of acetone and carbon dioxide ice. The particular products recovered depend, as indicated above, upon starting material and reaction conditions such as temperature, molar ratio of the reactants, etc. Substantially pure product may be recovered by distillation of condensates obtained above, and unreacted halogenated compound starting material recycled to subsequent operation.

Any suitable chamber or reactor tube constructed of inert material may be employed for carrying out the reaction provided the reaction zone is of sufficient length and cross-sectional area to accommodate the required amount of catalyst necessary to provide adequate gas contact area and at the same time afford sufficient free space for passage of the gas mixture at an economical rate of flow. Materials such as nickel, graphite, Inconel and other materials resistant to HF may be suitable for reactor tubes. Externally disposed reactor tube heating means such as electrical resistance heaters may be used for heating purposes.

The following examples illustrate practice of the invention, parts and percentages being by weight unless otherwise indicated:

*Example 1*

About 150 cc. (4 to 14 mesh) of zirconium fluoride catalyst, prepared by procedure substantially described in Example A above, activated just before use by heating for 3 hours in a stream of nitrogen at about 300° C.

and composed of crystallites of size below about 40 A., were arranged in a fixed bed supported in a vertically disposed one inch inside diameter nickel tube 30 inches long. The tube was externally electrically heated over a length of 24 inches and the tube ends were fitted with pipe connections for the inlet and outlet of a gas stream. Suitable thermocouples were arranged internally in the catalyst bed and externally of and adjacent to the nickel tube and inside the furnace. 620 parts of hexachloroacetone were vaporized and mixed with 216 parts of anhydrous HF, and the mixture was introduced into the feed end of the nickel tube and passed through the bed of $ZrF_4$ catalyst during a period of six hours. By adjusting the electrical heaters thereby to control the rate of heat input in the gas stream, the temperature of the reaction tube was maintained at about 360° C. as measured internally of the tube. Gaseous products of the reaction were withdrawn from the discharge end of the nickel tube, cooled to minus 78° C. in a cold trap in which all products except HCl were condensed. Uncondensed HCl exiting the trap was taken up in water. The condensate collected in the trap was distilled thru a fractionating column, and after distilling off unreacted HF there were obtained 108 parts of tetrafluorodichloroacetone, $CClF_2.CO.CClF_2$; 281 parts of trifluorotrichloroacetone in the form of a mixture containing about 25% (weight) $CF_3.CO.CCl_3$ and 75% $CClF_2.CO.CCl_2F$; and 60 parts of difluorotetrachloroacetone in the form of a mixture containing about equal parts by weight of $CCl_2F.CO.CCl_2F$ and $CClF_2.CO.CCl_3$. About 64% of the HF charged had reacted with equivalent formation of HCl.

*Example 2*

About 400 cc. of a $ZrF_4$ catalyst (4 x 14 mesh), prepared by procedure substantially as described in Example A above and comprising crystallite material of average size below 150 A., were charged into a fluorination reactor. During about 5 hours 2.47 mols of vaporous hexachloroacetone and 12.2 mols of anhydrous HF gas were simultaneously passed thru the reactor. Average catalyst bed temperature during the run was about 340° C., and average contact time was about 2 seconds. 4.88 mols of HCl were formed, indicating that 1.98 mols of HF had reacted per mol of hexachloroacetone. The molecular composition of the organic products recovered was as follows:

| | Percent |
|---|---|
| Trifluorotrichloroacetone $CClF_2.CO.CCl_2F$ | 36.8 |
| Difluorotetrachloroacetone: about equal parts of $CClF_2.CO.CCl_3$ and $CCl_2F.CO.CCl_2F$ | 47.0 |
| Monofluoropentachloroacetone $CCl_2F.CO.CCl_3$ | 16.2 |

The following examples are illustrative of some uses of the herein new compounds. In the processes of these particular examples it appears that reactions involved proceed in accordance with the following illustrations:

EQUATION A

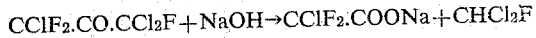
$CClF_2.CO.CCl_2F + NaOH \rightarrow CClF_2.COONa + CHCl_2F$

EQUATION B

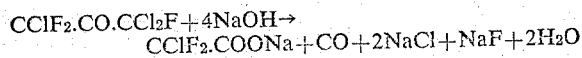
$CClF_2.CO.CCl_2F + 4NaOH \rightarrow$
$CClF_2.COONa + CO + 2NaCl + NaF + 2H_2O$ Reaction of Equation A is characterized by alkaline scission of the $CCl_2F$ radical, while the reaction of Equation B is characterized by halogen attack of the $CCl_2F$ radical resulting in decomposition and formation of CO, NaCl, NaF and $H_2O$ as by-products.

*Example 3*

1.5 mols of NaOH, as a 20% strength water solution, were added to 1.0 mol of $CCl_2F.CO.CCl_3$, B. P. 163–166° C. over a period of about 60 minutes. During incorporation of the NaOH solution, the reacting mass was maintained at a temperature of about 40° C. After about another hour, during which temperature did not exceed 40° C., the reaction mass was cooled to about 25° C., permitted to settle, and about 96 g. of chloroform were separated by decantation. The chloroform recovered amounted to about 80% of theory in accordance with Equation A above. The remaining aqueous reaction product was found to contain about 0.62 mol of NaCl. In this run about 20% of the original ketone had been subjected to halogen attack resulting in formation of by-products other than a haloform such as CO, NaCl, NaF, and $H_2O$, as indicated by Equation B. This reaction product containing $CCl_2F.COONa$ in solution was treated with about 1.5 mols of 100% $H_2SO_4$, in the form of 96% strength sulfuric acid. About 200 grams of benzene were added to extract $CCl_2F.COOH$. The extract was dried by azeotropic distillation of some of the benzene and all of the water present, and the dried benzene-$CCl_2F.COOH$ extract was fractionally distilled to recover $CCl_2F.COOH$ (B. P. 162° C.) as overhead. The quantity of $CCl_2F.COOH$ recovered amounted to 95% of theory.

*Example 4*

To one mol of $CCl_2F.CO.CCl_2F$ (B. P. 118–122° C.) were added 2 mols of NaOH, as a 20% strength water solution, over a period of about 90 minutes. During addition of the NaOH, temperature of the mass in the reaction vessel was maintained at about 20° C. About 70 g. (0.67 mol) of $CHCl_2F$ (B. P. 8.9° C.) were evolved in the course of the reaction and were recovered in a Dry-Ice trap. About 2 mols of 100% $H_2SO_4$, as a 96% sulfuric acid solution, were added to the mass in the reaction vessel. Similarly as in Example 3, the $CCl_2F.COOH$ formed by acidification of the $CCl_2F.COONa$ was benzene extracted, the extract dried, and the quantity of $CCl_2F.COOH$ recovered on final fractional distillation amounted to 93% of theory.

*Example 5*

One mol of $CClF_2.CO.CCl_3$ (B. P. about 120° C.) was slowly added while agitating over a period of about 90 minutes to 1.8 mols of NaOH, as 20% strength water solution. During addition of the NaOH solution, the reaction vessel was cooled externally to maintain reaction temperature at about 25° C. After succeeding 1½ hours, the liquid phases formed in the reaction vessel were separated, and about 0.75 mol of $CHCl_3$ was recovered. Analysis of the remaining aqueous phase showed the presence of 0.76 mol chloride ion, indicating that about 25% of the ketone starting material had been subjected to halogen attack. This aqueous phase containing $CClF_2.COONa$ in solution was acidified by addition of 2 mols of 100% $H_2SO_4$ as 96% sulfuric acid. $CClF_2.COOH$ was extracted from the acidified liquor with benzene as in Example 3, and $CClF_2.COOH$ (B. P. 121° C.) was recovered from the dried extract in amount equal to 95% of theory.

*Example 6*

One mol of $CClF_2.CO.CCl_2F$ (B. P. 84.2° C.) was added slowly over a period of about 120 minutes to 220 g. of powdered 85% KOH (3.3 mols of 100% KOH) suspended in about 500 g. of benzene. During incorporation of the KOH, the mass was agitated, and external cooling of the reaction vessel was such as to maintain temperature of the reacting mass at about 30–40° C. Carbon monoxide and $CHCl_2F$ were evolved and about 0.4 mol of $CHCl_2F$ was collected in a Dry-Ice trap. The bulk of the benzene was decanted off from the reacted mass, and the solid relatively slurry-like potassium salt product $CClF_2.COOK$ was dissolved by addition of about 100 g. of water. Analysis of the resulting aqueous solution for chloride and fluoride ions showed that about 60% of the original ketone had been subjected to halogen attack. The aqueous solution was acidified by addition of about 400 g. of 100% $H_2SO_4$, as 96% sulfuric acid solution. Following benzene extraction, azeotropic removal of water, and distillation similarly as in Example 3, $CClF_2.COOH$ (B. P. 121° C.) was recovered in amount equal to 92% of theory.

Example 7

One mol of $CClF_2.CO.CClF_2$ (B. P. 44° C.) was added dropwise during one hour to a cooled agitated suspension of 160 g. powdered NaOH (4 mols) in 500 cc. of benzene. Reaction temperature was maintained at about 40° C. Carbon monoxide was evolved. After a further period of about 2 hours, to permit completion of reaction, the reaction product was cooled to about 20° C. and filtered. The solids were dried by heating under vacuum at about 50° C. Analysis showed that the dried solids contained 1.8 mols of NaF and 0.9 mol of NaCl. The solid reaction product containing $CClF_2.COONa$ was treated with 600 g. of 100% $H_2SO_4$ (6.1 mols), as 96% sulfuric acid solution, and $CClF_2.COOH$ and small amounts of HF and HCl were distilled out. Redistillation of the crude $CClF_2.COOH$ gave 122 g. of $$CClF_2.COOH$$

equal to 94% of theory.

Example 8

10.25 mols (54 g.) of $CF_3.CO.CCl_3$, B. P. 83.5–84.5° C., were mixed with cooling with 5 g. of water. To this mixture cooled in an ice bath was slowly added 0.5 mol (20 g.) of NaOH dissolved in 60 g. of water over a period of about 30 minutes. During incorporation of the NaOH solution, the reaction mass was maintained at a temperature of about 10–15° C. After the NaOH solution had been added, temperature was raised to about 50° C. and maintained at that point for about an hour to facilitate completion of reaction. The reaction mass containing $CF_3.COONa$ in solution after cooling to about room temperature, was treated by slow addition of 350 g. of 96% sulfuric acid. Chloroform and $CF_3.COOH$ were distilled out, and fractionation of the crude condensate thus obtained gave 27 g. (92% of theory) of $CF_3.COOH$, B. P. 71–73° C., and 24 g. of $CHCl_3$ (80% of theory).

The hereindescribed fluorochloro acids are known in the art. The mono and tri fluoro acids are suitable for use as esterification catalysts, and the mono and di fluoro acids constitute effective solvents for cellulose.

Subject matter of Examples 3–8 inclusive is disclosed and claimed in our copending application, Serial No. 494,236, filed of even date herewith.

This application is a continuation in part of our copending application Serial No. 411,027, filed February 17, 1954, now abandoned.

We claim:

1. The process for making a perchlorofluoro acetone which process comprises introducing a substantially anhydrous gas-phase mixture of HF and a starting material—said starting material comprising a perhalogenated chloroacetone containing zero to not more than 3 fluorine atoms and wherein all halogens are of the group consisting of chlorine and fluorine—into a reaction zone containing substantially anhydrous zirconium fluoride catalyst having crystallite size not substantially greater than about 400 Angstrom units radius and having been derived by reaction of substantially anhydrous $ZrCl_4$ and substantially anhydrous HF, heating said mixture in said zone in contact with said catalyst at fluorination temperature in the approximate range of 210–450° C. to effect fluorination of substantial amount of said starting material and formation of a product comprising a perchlorofluoroacetone containing at least two chlorine atoms, and wherein the fluorine content is greater than that of said starting material, and withdrawing said product from said zone.

2. The process of claim 1 in which fluorination temperature is approximately in the range of 300–400° C.

3. The process of claim 1 in which the catalyst crystallite size is not substantially greater than about 150 Angstrom units radius.

4. The process for making a perchlorofluoroacetone which process comprises subjecting a starting material—said starting material comprising a perhalogenated acetone containing zero to not more than 3 fluorine atoms and wherein all halogens are of the group consisting of chlorine and fluorine—in a reaction zone to the action of substantially anhydrous HF, while in the presence of substantially anhydrous zirconium fluoride catalyst of crystallite size not substantially greater than 400 Angstrom units radius and having been derived by reaction of substantially anhydrous $ZrCl_4$ and substantially anhydrous HF, at elevated temperature high enough to effect fluorination of substantial amount of said starting material and formation of a product comprising a perchlorofluoroacetone and containing at least two chlorine atoms and wherein the fluorine content is greater than that of said starting material.

5. The process for making a perchlorofluoroacetone which process comprises introducing a substantially anhydrous gas phase mixture of HF and hexachloroacetone into a reaction zone containing zirconium fluoride catalyst having crystallite size not substantially greater than about 400 Angstrom units radius and having been derived by reaction of substantially anhydrous $ZrCl_4$ and substantially anhydrous HF, heating said mixture in said zone in contact with said catalyst at fluorination temperature in the approximate range of just above the boiling point of hexachloroacetone to 450° C., to effect fluorination of substantial amount of said hexachloroacetone and formation of a product comprising a perchlorofluoroacetone containing at least two chlorine atoms, and recovering perchlorofluoroacetone from said product.

6. The process for making perchlorofluoroacetone which process comprises introducing a substantially anhydrous gas-phase mixture of HF and hexachloroacetone into a reaction zone containing substantially anhydrous zirconium fluoride catalyst having crystallite size not substantially greater than about 150 Angstrom units radius and having been derived by reaction of substantially anhydrous $ZrCl_4$ and substantially anhydrous HF, heating said mixture in said zone in contact with said catalyst at fluorination temperature in the approximate range of 300–400° C. to effect fluorination of substantial amount of said hexachloroacetone and formation of a product comprising a perchlorofluoroacetone containing at least two chlorine atoms, withdrawing said product from said zone, and recovering perchlorofluoroacetone from said product.

References Cited in the file of this patent

UNITED STATES PATENTS

| | | |
|---|---|---|
| 2,423,045 | Passino et al. | June 24, 1947 |
| 2,533,132 | McBee et al. | Dec. 5, 1950 |
| 2,567,569 | McBee et al. | Sept. 11, 1951 |
| 2,614,129 | McBee et al. | Oct. 14, 1952 |
| 2,709,688 | Bandes et al. | May 31, 1955 |